United States Patent [19]

Lunsford, Jr.

[11] Patent Number: 5,172,769
[45] Date of Patent: Dec. 22, 1992

[54] REVERSIBLE TILLAGE ATTACHMENT FOR BIDIRECTIONAL MOLD BOARD PLOW

[76] Inventor: Clifford A. Lunsford, Jr., Rte. 1, Box 650, Richland, Ga. 31825

[21] Appl. No.: 664,197

[22] Filed: Mar. 4, 1991

[51] Int. Cl.$^5$ .............................................. A01B 49/02
[52] U.S. Cl. .................................... 172/162; 172/255; 172/219; 172/202
[58] Field of Search ............... 172/162, 161, 779, 142, 172/693, 201, 202, 255, 132, 209, 210, 219, 221, 605, 684.5, 618, 315

[56] References Cited

U.S. PATENT DOCUMENTS

| | | | |
|---|---|---|---|
| 3,523,584 | 8/1970 | Godbersen | 172/161 |
| 3,574,320 | 4/1971 | Sigmund | 172/202 |
| 4,800,963 | 1/1989 | Gomez | 172/219 |
| 4,942,928 | 7/1990 | Gomez | 172/219 |
| 5,000,267 | 3/1991 | Harrell | 172/459 |
| 5,020,603 | 6/1991 | Harrell | 172/666 |

FOREIGN PATENT DOCUMENTS

| | | | |
|---|---|---|---|
| 812199 | 3/1981 | U.S.S.R. | 172/219 |
| 1207408 | 1/1986 | U.S.S.R. | 172/219 |

OTHER PUBLICATIONS

Kasco, "Red Dragon" Brochure, Jan. 1979.
Noble, clod-buster plow ridges attachment brochure, Sep. 1979 Royal Industries.
Midwest Buster Bar Brochure. Jan. 1979, Midwest Industries Inc.

Primary Examiner—Randolph A. Reese
Assistant Examiner—Spencer Warnick
Attorney, Agent, or Firm—Watson, Cole, Grindle & Watson

[57] ABSTRACT

A tiller attachment for switchable bidirectional mold board plow which is adapted to be mounted onto the tool bar of the plow. The attachment includes a pair of axially spaced apart frame members which support arms joined at a right angles at a pivot point. The frame members lie in parallel spaced apart planes perpendicular to the axis of the tool bar and are pivotable from the right to the left side thereof. Tine bars are pivotably mounted to free ends of the frame members and are rotatable into ground engaging positions. An actuator which is responsive to the position of the plow rotates the frame members so that the tines firmly engage the ground behind the plow.

13 Claims, 2 Drawing Sheets

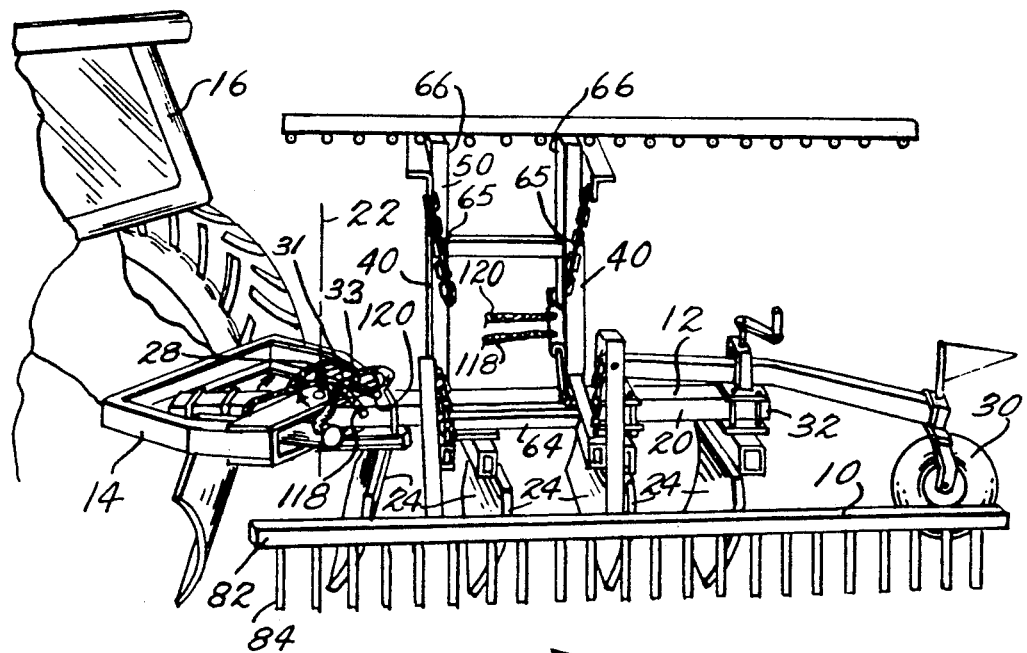

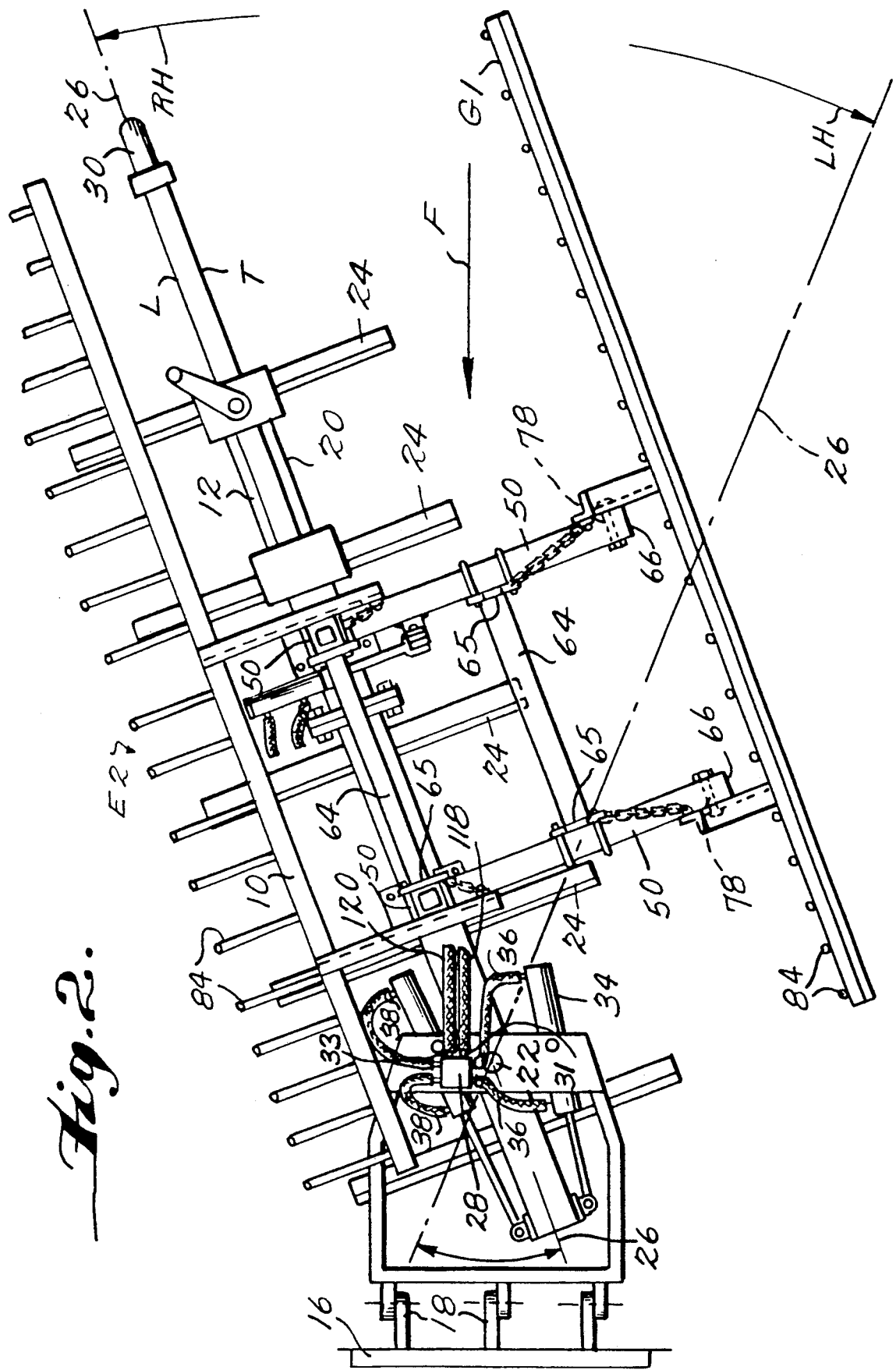

REVERSIBLE TILLAGE ATTACHMENT FOR BIDIRECTIONAL MOLD BOARD PLOW

BACKGROUND OF THE INVENTION

The invention relates to farm implements and in particular relates to an attachment for a bidirectional mold board plow which is adapted to engage the ground in a trailing relationship with respect to the mold boards.

Bidirectional mold board plows are known. In particular, Gomez U.S. Pat. No. 4,800,963 describes a mold board plow which has a tool bar that supports ground engaging mold boards. The tool bar is pivotably secured in a frame and is movable into left and right hand positions behind the tractor. A hydraulic reversing mechanism is connected to the frame to set the tool bar at an angle to the left or to the right with respect to the direction of motion of the plow. It is desirable to reverse the plow so that when the tractor direction is reversed, the ground is turned over in the same direction with each pass.

Mold board plows pick up large chunks of earth and produce clods which interfere with subsequent planting operations. One known device which conditions the soil after plowing is described in Sigmund U.S. Pat. No. 3,574,320. A mulching tool is pivotably mounted to a support which is carried by the plow frame. The mulching tool trails the plow at all times. The plow is not reversible.

SUMMARY OF THE INVENTION

A tiller attachment for a switchable bidirectional mold board plow is adapted to be mounted onto the tool bar of the plow. The attachment includes a pair of axially spaced apart frame members which are supported at a pivot points lying on a pivot axis. In use, the frame members lie in parallel spaced apart planes perpendicular to the axis of the tool bar and are pivotable between operative positions on the right and the left side of the tool bar. Tine bars are pivotably mounted to opposite sides of the frame members and are each rotatable into a ground engaging position. An actuator, coupled to the frame members is responsive to the position of the plow for rotating and positively securing the frame members so that the tines firmly engage the ground behind the plow.

In a particular embodiment of the invention, the frame members include a pair of arms joined at right angles at the pivot point. The arms have spaced apart free ends. Axially adjacent right and left arms of each pair of frame members are interconnected in a common plane for common pivotal rotation to the right and left sides of the pivot axis. The free ends of the interconnected arms lie on an axis which is parallel with the pivot axis. Elongated linkage arms pivotably secured to the free ends of the axially adjacent arms couples each tine bar to the corresponding frame member. The linkage arms have free ends extending away from the tines and a flexible linkage couples the free end of the linkage arm to a portion of the frame members for limiting rotational movement of the tine bars in one direction inboard of the plow and allowing the tine bars to move away from hard debris. When secured in position by the actuator, the weight of the tine bar is sufficient to allow the tines to firmly engage the ground and break up clods behind the plow. However, the pivotal mounting of the tine bar allows the tine bar to swing out of the way of hard debris.

BRIEF DESCRIPTION OF THE DRAWINGS

FIG. 1 is a perspective view of the tillage attachment according to the invention as shown in operative relation with a mold board plow coupled to a tractor;

FIG. 2 is a top plan view of the tillage attachment coupled to the mold board plow;

FIG. 3 is a fragmentary side view of an actuator for the tillage attachment of the invention in the left hand ground engaging position;

FIG. 4 is a fragmentary end view of the tillage attachment of the invention in the alternate right hand position; and FIG. 5 is a fragmentary section through lines 5—5 of FIG. 4.

DESCRIPTION OF THE PREFERRED EMBODIMENT

FIGS. 1-5 illustrate a tillage attachment 10 in accordance with the present invention. However, before describing the invention in detail, it is necessary to briefly describe the plow 12 to which the tillage attachment 10 is secured.

The plow 12 includes a frame 14 adapted to be secured to a tractor 16 by a conventional three point hitch 18. The frame 14 pivotably supports a tool bar 20 about a vertical axis 22. The tool bar 20 supports mold boards 24 generally at right angles to the long or central axis 26 of the tool bar 20. A ground engaging wheel 30 supports a trailing end 32 of the tool bar. A hydraulic mechanism 34 having left and right hydraulic lines 36 and 38 is secured between the frame 14 and the tool bar 20 to reverse the direction of the tool bar 20 from the right hand position RH shown to the left hand position LH (shown only by the shifted axis 26 in phantom lines) at the extremes of the double headed arrow 21. Reversal of the tool bar 20 usually occurs when the tractor 16 is turned around for plowing in adjacent line in the field from the opposite direction.

For purposes of the discussion, the left and right are generally regarded with respect to the forward direction F of the tractor and attached plow 12. The trailing side T is behind the tool bar 20 and the leading side L is ahead of the plow 12 and behind the tractor 16.

In one embodiment of the invention, the tillage attachment 10 comprises a pair of frame members 40 which when in use are adapted to be pivotably mounted to the tool bar 16 of the plow 12. Each frame member 40 includes a base 42 secured to the tool bar 16 by means of U-clamps 44. The base 42 has upstanding lugs 46 having aligned apertures 48. The frame members 48 include a pair of arms 50 which are secured together at the corner 52. An aperture 54 is formed in the corner portion 52 and the frame members 40 are secured between the lugs 46 by means of a pin 56. The frame members 40 rotate about pivot axis 60 which is collinear with axis of the pins 56. Corner brace 62 is welded to the arms 50 in the corner 52 for securing the arms 50 rigidly. Connecting rods 64 are attached at opposite ends 65 to adjacent arms 50 of the frame members 40 as illustrated as for example in FIG. 2. The adjacent arms 50 lie in the same plane. When in use, the joined together frame members 40 are adapted to rotate about the axis 60 between respective LH and RH positions.

Arms 50 have free ends 66 (FIGS. 1 and 2) which extend away from the pivot pin 56. A rake or tine assembly 70 is pivotally attached to the free ends 66 of the adjacent parallel spaced apart arms 50 by means of an adjustable linkage 72 having a plurality of apertures 74 therein which may be aligned with apertures 76 in the free ends 66 of the arms 50. Bolts or pins 78 (FIG. 2) secure the tine assembly 70 to the arms 50 as illustrated. The pins 78 may be threaded bolts.

Each time assembly 70 includes a tine bar 80 coupled or welded to one end 82 of the linkage 72. The tine bars 80 have tines or rake members 84 (FIG. 2) welded thereto and extending therefrom as illustrated. A free end 86 of the linkage 72 extends away from the tine bar 80 and a chain 88 is connected between the free end 86 of the linkage 72 and the arms 50 by means of appropriate fasteners or by welding.

A hydraulic actuator 90 is mounted to one of the base members 42 as illustrated in FIGS. 3 and 4. The hydraulic actuator 90 includes a cylinder 92 having a fixed end 94 with apertured ears 95, a movable end 96 with apertured ears 97 and a connecting rod 93 coupled to a piston (not shown) in the cylinder. A support bracket 100 is welded or secured to one of the base members 42 as illustrated and extends outwardly therefrom more or less perpendicular to the axis 60. The support member 100 has an upstanding apertured lug 102. A pin 105 secures the ears 95 at the fixed end 94 of the cylinder, 92 to the lug 102. An L-shaped bracket 110 is rigidly connected to (e.g., as by welding) the arm 50 as illustrated (FIGS. 3 and 4). The free end 112 of the L-shaped bracket 110 (FIGS. 3 and 4) has an aperture (not shown) which is secured to the ears 97 at the apertured movable end 96 of the cylinder 92 by means of pin 116.

Left and right hydraulic lines 118-120 are coupled to the cylinder 90 and to the corresponding left and right hydraulic lines 31 and 33 of the hydraulic mechanism 28 (FIG. 2) on the plow 10. In accordance with the invention, when the plow 10 has the tool bar 20 oriented to the left, one set of tines 82 is firmly and positively located and secured in a first ground engaging position G1 trailing behind mold boards 24. When the tractor 16 direction is reversed the operator actuates the hydraulic mechanism 34 to move the tool bar 20 from the right hand RH side shown to the left hand LH side or vice versa. At the same time, the cylinder 92 which is coupled to the hydraulic mechanism 28 by means of lines 118-120 is actuated from one position to the other causing the attachment 10 to rotate about the axis 60 so that the tines 82 that are in the first ground engaging position G1 are lifted up to elevated position E1, and the tines 82 which are in elevated position E2 move into the second ground engaging position G2 in trailing relationship with the plow 20. Thus, the cylinder 92 moves the frame 40 between the right hand and left hand positions and in addition positively secures and holds the frame 40 against rotational movement when in the desired position so that the tines firmly engage the ground.

When firmly secured in position by the cylinder, the weight of the tine bars 80, tines 82 and linkage 72 is sufficient to allow the tine assembly 70 to drag along the ground behind the mold boards 24 and break up clods (not shown). At the same time, if an object such as a heavy stone or other hard debris is unearthed by the mold boards 24, the tine assembly 70 may rotate out of the way about the pivot 76 so that it is undamaged. The angle 122 at which the tine assembly 70 engages the ground is defined by the length of the chain 88. The chain 88 maintains the tine bar assembly 70 which is elevated at a proper angle 122 for engaging the ground when it is moved from the elevated position E2 to the corresponding ground engaging position G2.

In accordance with the invention, there has been provided an attachment 10 for a mold board plow 120 which is rotatable about an axis 26 parallel to the tool bar 20 of the plow 22 and which attachment engages the ground in trailing relationship with respect to mold boards 24. When the plow 12 is switched from between left side LH orientation to right side RH orientation, the attachment 10 rotates the ground engaging tines 82 upwardly and lowers the elevated tines 82 firmly into ground engaging relationship behind or trailing the mold boards 24. The tines 82 pivot out of the way of solid obstacles and break up clods behind the mold boards 24.

While there has been described what at present is considered to be the preferred embodiment of the present invention it will be apparent to those skilled in the art that various changes and modifications may be made therein without the departing from the invention and it is intended in the appended claims to cover all such changes and modifications as forward in the true spirit and scope of the invention.

What is claimed is:

1. A tillage attachment for breaking clods attachable to a switchable bidirectional moldboard plow adapted to be pulled in a forward direction by a farm tractor for turning up the ground and having a hydraulically swingable tool bar for carrying group engagable moldboards in alternate right and left angular positions relative to said forward direction, said attachment comprising:

a pivot axis which in use is aligned with the swingable tool bar;
at least one pair of interconnected axially spaced apart adjacent frame members being adapted for pivotable motion between right and left positions about the pivot axis;
each frame member including a pivot located on the pivot axis and a right and left side radial arm joined at the pivot axis, each arm having a corresponding free end spaced from the pivot;
axially adjacent respective ones of said right and left arms being rigidly interconnected in a common plane for common pivotal movement about the pivot axis to the respective right or left side of said pivot axis, the free ends of the interconnected arms lying in an axis parallel to and rotatably concentric with the pivot axis;
a right side tine bar connected to the free ends of the right radial arms and a left side tine bar connected to the free ends of the left side radial arms;
each tine bar including a plurality of parallel spaced apart round engaging tines extending therefrom;
means coupled to at least one of the frame members for driving the frame members between the right and left positions about the pivot axis, said means being responsive to the right or left angular position of the tool bar for securing the tines of the respective right or left tine bar into a ground engaging position in trailing relationship with respect to the mold boards.

2. The tillage attachment according to claim 1 wherein the radial arms of each frame member are disposed at right angles.

3. The tillage attachment according to claim 1 wherein linkage means extends from each tine bar and pivotably connects each adjacent pair of free ends of the arms to each respective tine bar.

4. The tillage attachment according to claim 3 wherein the tines are rigid and the tine bars have a weight sufficient to break up clods and are pivotably yieldable to other ground debris.

5. The tillage attachment according to claim 1 wherein the pivot axis of the frame members is above the tool bar when in use.

6. The tillage attachment according to claim 1 wherein the respective right side and left side tine bars are alternately movable between the ground engaging position trailing the mold boards and an elevated position above the pivot axis.

7. A ground engaging tillage attachment for breaking up clods behind a plow to which it is adapted to be attached, the plow having a tool bar carrying plow elements for turning over the ground, and the tool bar being reversible between respective right hand and left hand positions for selectively locating the plow elements, said tillage attachment comprising:

a frame for attachment to the tool bar including a base and at least two spaced apart first parallel support arms secured at their proximal ends to the base and having distal free ends rotatable, when in use, between an elevated position above the tool bar and a lowered position to the left side of the tool bar, and at least two spaced apart second parallel support arms secured at their proximal ends to the base and having distal free ends rotatable, when in use, between an elevated position above the tool bar and a lowered position to the right side of the tool bar;

a left side and a right side tine assembly pivotably attached to the free ends of the respective first and second parallel support arms, each tine assembly including a tine bar in parallel spaced relation with the tool bar, a row of spaced apart parallel tines attached to the tine bar, said tines extending, when in use, downwardly against the ground, and an elongated connecting bar for each support arm having a free end coupled at its other end to the tine bar and pivotably coupled at selectable locations therealong to the corresponding support arm, and a flexible linkage coupled between the free end and the corresponding arm for securing the tine bar at a selected angle relative to the ground when in use, said tine bar being yieldably operable to break up clods behind the plow and to pivotably yield to unbreakable materials on the ground;

means responsive to the right hand and left hand positions of the plow for alternately locating the respective left hand and right hand tine assembly in the lowered ground engaging position behind the plow while the other tine assembly is elevated.

8. The tillage attachment according to claim 7 wherein the first and second parallel support arms lie in perpendicular planes.

9. The tillage attachment according to claim 7 wherein the free ends of the first and second parallel arms each have an aperture and the elongated arms have a plurality of apertures at selected locations therealong and a pin for each free end secures the corresponding elongated bar pivotably thereto at one of said selected locations for adjusting the location of the tine bars relative to the ground.

10. A tillage attachment for a switchable bidirectional moldboard plow adapted to be pulled in the forward direction by a farm tractor and having a switchable tool bar for carrying ground engaging mold boards to alternate right and left hand positions disposed at an angle relative to the forward direction, said tool bar being connected at one end to a tractor hitch and having a swingable trailing end supported by a ground engaging wheel, and a tool bar hydraulic cylinder means connected between the hitch and the tool bar for selectively moving the tool bar between alternate right and left hand positions, said tillage attachment which in use comprises:

a pair of axially spaced apart frame members pivotably mounted on the tool bar along a pivot axis, said pivot axis is aligned with the tine bar, the frame members each including a base member attachable to the tool bar and opposing left and right arms rotatably attached to the base members, said arms extending away from each other at right angles and lying in parallel planes perpendicular to the pivot axis, said arms having free ends, connecting bars parallel to the pivot axis interconnecting adjacent arms for maintaining the arms in the same plane as the frame members, tine bars being pivotably mounted to corresponding pairs of the free ends of the axially adjacent arms in the same plane, said tine bars including a plurality of ground engaging tines attached thereto extending at an angle with respect to the arm, said tines engaging the ground when the corresponding arms lie in a horizontal plane and the other tines being elevated away from the ground; actuator means responsively coupled to the tool bar hydraulic cylinder means governing the tool bar, said actuator means being connected between the base member and one of the arms pivotably attached thereto for alternately raising one set of tines and lowering the other set of tines as the plow direction is changed between the respective right and left hand positions.

11. The tillage attachment according to claim 10 wherein the actuator means comprises a cylinder support secured at one end to one of the base members and having a free end transverse to the pivot axis on one side thereof, an apertured upstanding lug extends above the pivot axis at the free end, and an apertured bracket aligned with the support attached to one of said arms on the other side of the axis remote from the lug, a hydraulic cylinder attached between the lug and the bracket being operative to alternately drive the frame between first and second positions in which the arms on one side of the axis are lowered while the arms on the other side of the axis are elevated.

12. The tillage attachment of claim 11 wherein the hydraulic cylinder includes hydraulic lines coupled to the tool bar, hydraulic cylinder means of the plow, said hydraulic cylinder is operative, such that, when the plow is located to the left, the right arms are lowered to locate and hold the tines in ground engaging position in trailing relationship with the plow and the left arms are elevated and when the plow is located to the right, the left arms are lowered to locate and hold the tines in ground engaging position in trailing relationship with the plow and the right arms are elevated.

13. A tillage attachment for a trailable plow swingable between right and left positions, said attachment comprising:

a pivot lying on a pivot axis;

at least one pair of axially spaced apart frame members being attached to the pivot and rotatable about the pivot axis between first and second positions, respectively, to the right and left of the plow;

each frame member having a pair of arms with free ends extending radially away from the pivot;

means for interconnecting the frame members such that axially adjacent ones of said arms lie in a common plane for pivotal movement about the pivot axis, the free ends of the interconnected arms lying in an axis parallel to and rotatably concentric with the pivot axis;

a tine bar connected to each pair of arms at their free ends;

a plurality of parallel spaced apart tines extending from each tine bar;

means responsive to the position of the plow and coupled to at least one of the frame members for driving the frame members between the first and second positions about the pivot axis.

* * * * *